(12) United States Patent
Mueller et al.

(10) Patent No.: US 12,019,692 B1
(45) Date of Patent: Jun. 25, 2024

(54) IMAGE DISPLAY SYSTEMS AND METHODS

(71) Applicant: Truist Bank, Charlotte, NC (US)

(72) Inventors: Mary Margaret Mueller, Charlotte, NC (US); Jamie Nathaniel Franklin, Charlotte, NC (US)

(73) Assignee: TRUIST BANK, Charlotte, NC (US)

( * ) Notice: Subject to any disclaimer, the term of this patent is extended or adjusted under 35 U.S.C. 154(b) by 1 day.

(21) Appl. No.: 18/065,925

(22) Filed: Dec. 14, 2022

(51) Int. Cl.
*G06F 16/951* (2019.01)
*G06F 3/0482* (2013.01)

(52) U.S. Cl.
CPC .......... *G06F 16/951* (2019.01); *G06F 3/0482* (2013.01)

(58) Field of Classification Search
CPC ............................. G06F 16/951; G06F 3/0482
USPC ....................................................... 707/705
See application file for complete search history.

(56) References Cited

U.S. PATENT DOCUMENTS

| | | | |
|---|---|---|---|
| 10,853,791 B1 * | 12/2020 | Ellis .................. | G06Q 20/3676 |
| 11,392,715 B1 * | 7/2022 | Gurram ............... | G06F 21/6245 |
| 2016/0012465 A1 * | 1/2016 | Sharp .................. | G06Q 20/321 705/14.17 |
| 2017/0188213 A1 * | 6/2017 | Nirantar ............... | H04L 67/564 |
| 2023/0385813 A1 * | 11/2023 | Fenichel ............ | G06Q 20/2295 |

OTHER PUBLICATIONS

"For those credit card holders with long names, on what credit cards were you able to get your full name?", Reddit, posting "2 years ago" by user Makoto_Shishio_81, Feb. 2022, downloaded from www.reddit.com/r/CreditCards/comments/vqk3og/for_those_credit_card_holders_with_long_names_on/?rdt=55782, 2 pages.*

* cited by examiner

*Primary Examiner* — Robert Stevens
(74) *Attorney, Agent, or Firm* — Michael A. Springs, Esq.; Shumaker, Loop & Kendrick, LLP; Patrick B. Horne

(57) ABSTRACT

Systems and methods display, via a user interface of a user device, a webpage associated with a user account of a user and comprising image(s), each image being associated with a corresponding user apparatus specific to the user. Selectable input options associated with each user apparatus corresponding to each image are provided, via the webpage, where each selectable input option comprises element setting(s) each having rules associated therewith that regulate user apparatus elements of each user apparatus, where at least one selectable input option of the selectable input options includes a modifiable visual element of an image. An indication is received to generate a physical apparatus comprising a visual element selected by the user, the visual element modifying the modifiable visual element of the image, where the generated physical apparatus is to be distributed to a physical location defined by the user.

18 Claims, 5 Drawing Sheets

IMAGE DISPLAY SYSTEMS AND METHODS

FIELD OF THE INVENTION

This invention is related generally to the field of image display systems and methods, and more particularly embodiments of the invention relate to webpages that display one or more images.

BACKGROUND OF THE INVENTION

Bank cards are used by many individuals and entities throughout the world to access financial resources without having to use cash. Additionally, bank cards provide added convenience by enabling purchases to be made online, over the phone, at physical stores, or in various other ways. Because there are so many ways in which individuals and entities may want to use their bank cards, financial institutions often provide various functionalities to bank card users so that such users can utilize their bank cards in a manner that best fits their needs. This versatility in functionality can attract individuals and entities to utilize certain bank cards and, as a result, can increase the customer base of the financial institutions.

However, the functionalities available to the bank card users can always be improved upon and expanded in order to attract more customers and retain existing customers. Thus, a need exists from improved functionalities that can be made available to bank card users.

BRIEF SUMMARY

Shortcomings of the prior art are overcome and additional advantages are provided through the provision of a computing system for image display. The computing system includes, for instance, a memory, one or more processors in communication with the memory, and program instructions executable by the one or more processors via the memory. Upon execution of the program instructions the computing system, in part, displays, via a user interface of a user device, a webpage accessible via an internet connection, the webpage being associated with a user account of a user and comprising one or more images, wherein each image of the one or more images is associated with a corresponding user apparatus that is specific to the user. Further, multiple selectable input options associated with each user apparatus corresponding to each image of the one or more images are provided via the webpage. Additionally, an indication to generate a physical apparatus that includes a visual element selected by the user is received, where the visual element modifies the modifiable visual element of the image, where the generated physical apparatus is to be distributed to a physical location defined by the user.

Additionally, disclosed herein is a computing system for image display, where the computing system includes, for instance, a memory, one or more processors in communication with the memory, and program instructions executable by the one or more processors via the memory. Upon execution of the program instructions the computing system, in part, displays, via a user interface of a user device, one or more bank card images that are each associated with a respective physical bank card of a user, each bank card image of the one or more bank card images having actionable user inputs associated therewith. In addition, it is determined that an actionable user input of the actionable user inputs has been provided, the actionable user input defining one or more parameters of account usage of an account associated with a physical bank card of the user. Further, one or more restrictions defined by the one or more parameters on the account associated with the physical bank card of the user are applied.

Also disclosed herein is a computer-implemented method for image display within a computing environment, where the computer-implemented method includes displaying, via a user interface of a user device, a webpage accessible via an internet connection, the webpage being associated with a user account of a user and comprising one or more images, where each image of the one or more images is associated with a corresponding user apparatus that is specific to the user. Further, multiple selectable input options associated with each user apparatus corresponding to each image of the one or more images are provided via the webpage, where each selectable input option of the multiple selectable input options includes one or more element settings each having rules associated therewith that regulate user apparatus elements of each user apparatus, and where at least one selectable input option of the multiple selectable input options includes a modifiable visual element of an image of the one or more images. An indication is also received to generate a physical apparatus that includes a visual element selected by the user, the visual element modifying the modifiable visual element of the image, wherein the generated physical apparatus is to be distributed to a physical location defined by the user.

The features, functions, and advantages that have been described herein may be achieved independently in various embodiments of the present invention including computer-implemented methods, computer program products, and computing systems or may be combined in yet other embodiments, further details of which can be seen with reference to the following description and drawings.

BRIEF DESCRIPTION

One or more aspects are particularly pointed out and distinctly claimed as examples in the claims at the conclusion of the specification. The foregoing as well as objects, features, and advantages of one or more aspects are apparent from the following detailed description taken in conjunction with the accompanying drawings in which:

DETAILED DESCRIPTION

Figure 1:
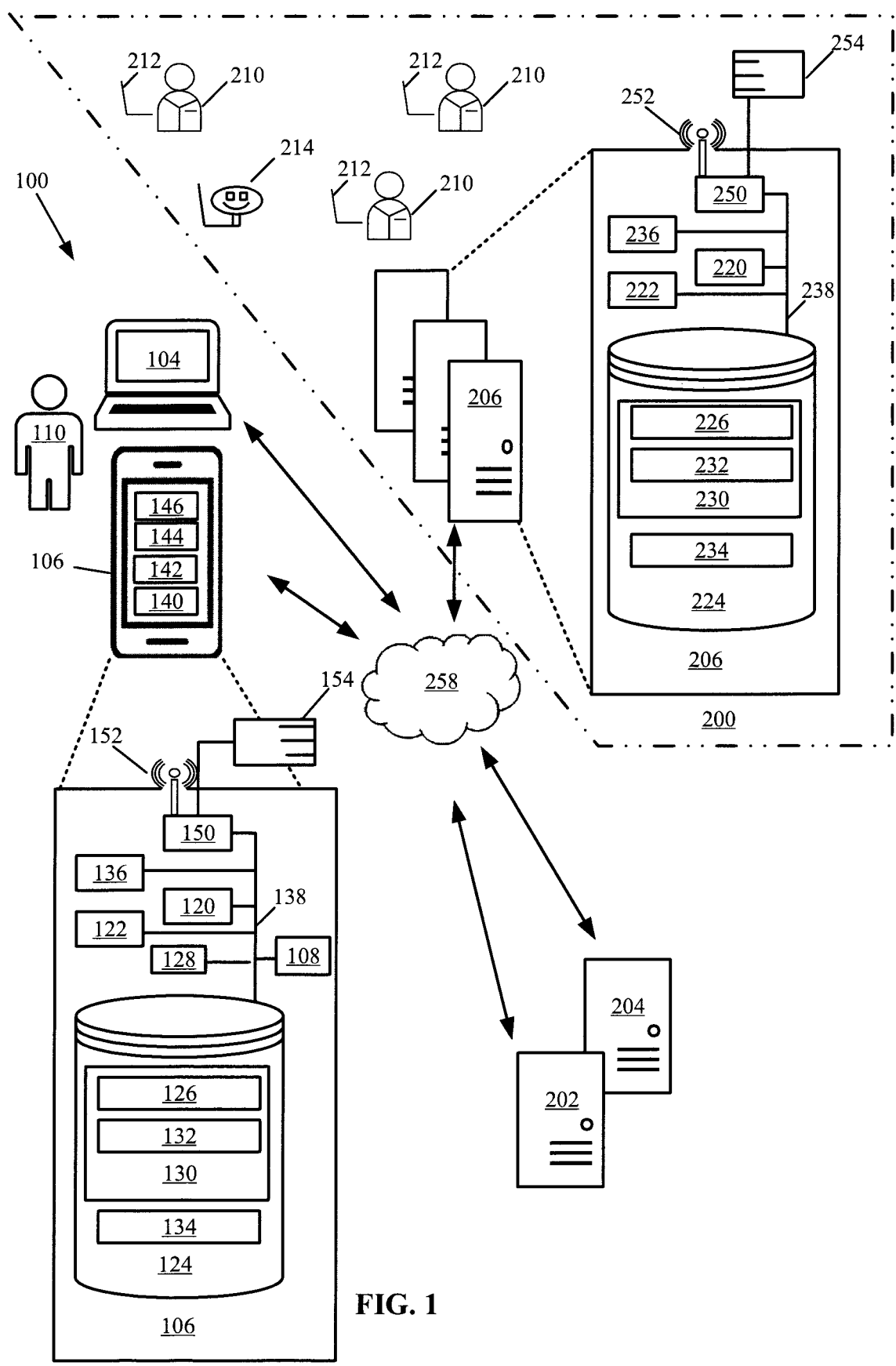
FIG. 1 illustrates an enterprise system and environment thereof for image display, in accordance with an embodiment of the present invention.

Aspects of the present invention and certain features, advantages, and details thereof are explained more fully below with reference to the non-limiting examples illustrated in the accompanying drawings. Descriptions of well-known processing techniques, systems, components, etc. are omitted so as to not unnecessarily obscure the invention in detail. It should be understood that the detailed description and the specific examples, while indicating aspects of the invention, are given by way of illustration only, and not by way of limitation. Various substitutions, modifications, additions, and/or arrangements, within the spirit and/or scope of the underlying inventive concepts will be apparent to those skilled in the art from this disclosure. Note further that numerous inventive aspects and features are disclosed herein, and unless inconsistent, each disclosed aspect or feature is combinable with any other disclosed aspect or feature as desired for a particular embodiment of the concepts disclosed herein.

Unless described or implied as exclusive alternatives, features throughout the drawings and descriptions should be taken as cumulative, such that features expressly associated with some particular embodiments can be combined with other embodiments.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the herein described embodiments can be configured without departing from the scope and spirit of the invention. Therefore, it is to be understood that, within the scope of the included claims, the invention may be practiced other than as specifically described herein.

Additionally, illustrative embodiments are described below using specific code, designs, architectures, protocols, layouts, schematics, or tools only as examples, and not by way of limitation. Furthermore, the illustrative embodiments are described in certain instances using particular software, tools, or data processing environments only as example for clarity of description. The illustrative embodiments can be used in conjunction with other comparable or similarly purposed structures, systems, applications, or architectures. One or more aspects of an illustrative embodiment can be implemented in hardware, software, or a combination thereof.

As understood by one skilled in the art, program code as referred to in this application can include both software and hardware. For example, program code in certain embodiments of the present invention can include fixed function hardware, while other embodiments can utilize a software-based implementation of the functionality described. Certain embodiments combine both types of program code.

FIG. 1 illustrates a system 100 and environment thereof, according to at least one embodiment, by which a user 110 benefits through use of services and products of an enterprise system 200. The environment may include, for example, a distributed cloud computing environment (private cloud, public cloud, community cloud, and/or hybrid cloud), an on-premise environment, fog computing environment, and/or an edge computing environment. The user 110 accesses services and products by use of one or more user devices, illustrated in separate examples as a computing device 104 and a mobile device 106, which may be, as non-limiting examples, a smart phone, a portable digital assistant (PDA), a pager, a mobile television, a gaming device, a laptop computer, a camera, a video recorder, an audio/video player, radio, a GPS device, or any combination of the aforementioned, or other portable device with processing and communication capabilities. In the illustrated example, the mobile device 106 is illustrated in FIG. 1 as having exemplary elements, the below descriptions of which apply as well to the computing device 104, which can be, as non-limiting examples, a desktop computer, a laptop computer, or other user-accessible computing device.

Furthermore, the user device, referring to either or both of the computing device 104 and the mobile device 106, may be or include a workstation, a server, or any other suitable device, including a set of servers, a cloud-based application or system, or any other suitable system, adapted to execute, for example any suitable operating system, including Linux, UNIX, Windows, macOS, iOS, Android and any other known operating system used on personal computers, central computing systems, phones, and other devices.

The user 110 can be an individual, a group, or any entity in possession of or having access to the user device, referring to either or both of the mobile device 104 and computing device 106, which may be personal or public items. Although the user 110 may be singly represented in some drawings, at least in some embodiments according to these descriptions the user 110 is one of many such that a market or community of users, consumers, customers, business entities, government entities, clubs, and groups of any size are all within the scope of these descriptions.

The user device, as illustrated with reference to the mobile device 106, includes components such as, at least one of each of a processing device 120, and a memory device 122 for processing use, such as random access memory (RAM), and read-only memory (ROM). The illustrated mobile device 106 further includes a storage device 124 including at least one of a non-transitory storage medium, such as a microdrive, for long-term, intermediate-term, and short-term storage of computer-readable instructions 126 for execution by the processing device 120. For example, the instructions 126 can include instructions for an operating system and various applications or programs 130, of which the application 132 is represented as a particular example. The storage device 124 can store various other data items 134, which can include, as non-limiting examples, cached data, user files such as those for pictures, audio and/or video recordings, files downloaded or received from other devices, and other data items preferred by the user or required or related to any or all of the applications or programs 130.

The memory device 122 is operatively coupled to the processing device 120. As used herein, memory includes any computer readable medium to store data, code, or other information. The memory device 122 may include volatile memory, such as volatile Random Access Memory (RAM) including a cache area for the temporary storage of data. The memory device 122 may also include non-volatile memory, which can be embedded and/or may be removable. The non-volatile memory can additionally or alternatively include an electrically erasable programmable read-only memory (EEPROM), flash memory or the like.

According to various embodiments, the memory device 122 and storage device 124 may be combined into a single storage medium. The memory device 122 and storage device 124 can store any of a number of applications which comprise computer-executable instructions and code executed by the processing device 120 to implement the functions of the mobile device 106 described herein. For example, the memory device 122 may include such applications as a conventional web browser application and/or a mobile P2P payment system client application. These applications also typically provide a graphical user interface (GUI) on the display 140 that allows the user 110 to communicate with the mobile device 106, and, for example a mobile banking system, and/or other devices or systems. In one embodiment, when the user 110 decides to enroll in a mobile banking program, the user 110 downloads or otherwise obtains the mobile banking system client application from a mobile banking system, for example enterprise system 200, or from a distinct application server. In other embodiments, the user 110 interacts with a mobile banking system via a web browser application in addition to, or instead of, the mobile P2P payment system client application.

The processing device 120, and other processors described herein, generally include circuitry for implementing communication and/or logic functions of the mobile device 106. For example, the processing device 120 may include a digital signal processor, a microprocessor, and various analog to digital converters, digital to analog converters, and/or other support circuits. Control and signal processing functions of the mobile device 106 are allocated between these devices according to their respective capabilities. The processing device 120 thus may also include the functionality to encode and interleave messages and data prior to modulation and transmission. The processing device 120 can additionally include an internal data modem. Further, the processing device 120 may include functionality to operate one or more software programs, which may be stored in the memory device 122, or in the storage device 124. For example, the processing device 120 may be capable of operating a connectivity program, such as a web browser application. The web browser application may then allow the mobile device 106 to transmit and receive web content, such as, for example, location-based content and/or other web page content, according to a Wireless Application Protocol (WAP), Hypertext Transfer Protocol (HTTP), and/or the like.

The memory device 122 and storage device 124 can each also store any of a number of pieces of information, and data, used by the user device and the applications and devices that facilitate functions of the user device, or are in communication with the user device, to implement the functions described herein and others not expressly described. For example, the storage device may include such data as user authentication information, etc.

The processing device 120, in various examples, can operatively perform calculations, can process instructions for execution, and can manipulate information. The processing device 120 can execute machine-executable instructions stored in the storage device 124 and/or memory device 122 to thereby perform methods and functions as described or implied herein, for example by one or more corresponding flow charts expressly provided or implied as would be understood by one of ordinary skill in the art to which the subject matters of these descriptions pertain. The processing device 120 can be or can include, as non-limiting examples, a central processing unit (CPU), a microprocessor, a graphics processing unit (GPU), a microcontroller, an application-specific integrated circuit (ASIC), a programmable logic device (PLD), a digital signal processor (DSP), a field programmable gate array (FPGA), a state machine, a controller, gated or transistor logic, discrete physical hardware components, and combinations thereof. In some embodiments, particular portions or steps of methods and functions described herein are performed in whole or in part by way of the processing device 120, while in other embodiments methods and functions described herein include cloud-based computing in whole or in part such that the processing device 120 facilitates local operations including, as non-limiting examples, communication, data transfer, and user inputs and outputs such as receiving commands from and providing displays to the user.

The mobile device 106, as illustrated, includes an input and output system 136, referring to, including, or operatively coupled with, one or more user input devices and/or one or more user output devices, which are operatively coupled to the processing device 120. The input and output system 136 may include input/output circuitry that may operatively convert analog signals and other signals into digital data, or may convert digital data to another type of signal. For example, the input/output circuitry may receive and convert physical contact inputs, physical movements, or auditory signals (e.g., which may be used to authenticate a user) to digital data. Once converted, the digital data may be provided to the processing device 120. The input and output system 136 may also include a display 140 (e.g., a liquid crystal display (LCD), light emitting diode (LED) display, or the like), which can be, as a non-limiting example, a presence-sensitive input screen (e.g., touch screen or the like) of the mobile device 106, which serves both as an output device, by providing graphical and text indicia and presentations for viewing by one or more user 110, and as an input device, by providing virtual buttons, selectable options, a virtual keyboard, and other indicia that, when touched, control the mobile device 106 by user action. The user output devices include a speaker 144 or other audio device. The user input devices, which allow the mobile device 106 to receive data and actions such as button manipulations and touches from a user such as the user 110, may include any of a number of devices allowing the mobile device 106 to receive data from a user, such as a keypad, keyboard, touch-screen, touchpad, microphone 142, mouse, joystick, other pointer device, button, soft key, infrared sensor, and/or other input device(s). The input and output system 136 may also include a camera 146, such as a digital camera.

Further non-limiting examples of input devices and/or output devices include, one or more of each, any, and all of a wireless or wired keyboard, a mouse, a touchpad, a button, a switch, a light, an LED, a buzzer, a bell, a printer and/or other user input devices and output devices for use by or communication with the user 110 in accessing, using, and controlling, in whole or in part, the user device, referring to either or both of the computing device 104 and a mobile device 106. Inputs by one or more user 110 can thus be made via voice, text or graphical indicia selections. For example, such inputs in some examples correspond to user-side actions and communications seeking services and products of the enterprise system 200, and at least some outputs in such examples correspond to data representing enterprise-side actions and communications in two-way communications between a user 110 and an enterprise system 200.

The input and output system 136 may also be configured to obtain and process various forms of authentication via an authentication system to obtain authentication information of a user 110. Various authentication systems may include, according to various embodiments, a recognition system that detects biometric features or attributes of a user such as, for example fingerprint recognition systems and the like (hand print recognition systems, palm print recognition systems, etc.), iris recognition and the like used to authenticate a user based on features of the user's eyes, facial recognition systems based on facial features of the user, DNA-based authentication, or any other suitable biometric attribute or information associated with a user. Additionally or alternatively, voice biometric systems may be used to authenticate a user using speech recognition associated with a word, phrase, tone, or other voice-related features of the user. Alternate authentication systems may include one or more systems to identify a user based on a visual or temporal pattern of inputs provided by the user. For instance, the user device may display, for example, selectable options, shapes, inputs, buttons, numeric representations, etc. that must be selected in a pre-determined specified order or according to a specific pattern. Other authentication processes are also contemplated herein including, for example, email authentication, password protected authentication, device verification of saved devices, code-generated authentication, text message authentication, phone call authentication, etc. The user device may enable users to input any number or combination of authentication systems.

The user device, referring to either or both of the computing device 104 and the mobile device 106 may also include a positioning device 108, which can be for example a global positioning system device (GPS) configured to be used by a positioning system to determine a location of the computing device 104 or mobile device 106. For example, the positioning system device 108 may include a GPS transceiver. In some embodiments, the positioning system device 108 includes an antenna, transmitter, and receiver. For example, in one embodiment, triangulation of cellular signals may be used to identify the approximate location of the mobile device 106. In other embodiments, the positioning device 108 includes a proximity sensor or transmitter, such as an RFID tag, that can sense or be sensed by devices known to be located proximate a merchant or other location to determine that the consumer mobile device 106 is located proximate these known devices.

In the illustrated example, a system intraconnect 138, connects, for example electrically, the various described, illustrated, and implied components of the mobile device 106. The intraconnect 138, in various non-limiting examples, can include or represent, a system bus, a high-speed interface connecting the processing device 120 to the memory device 122, individual electrical connections among the components, and electrical conductive traces on a motherboard common to some or all of the above-described components of the user device (referring to either or both of the computing device 104 and the mobile device 106). As discussed herein, the system intraconnect 138 may operatively couple various components with one another, or in other words, electrically connects those components, either directly or indirectly—by way of intermediate component(s)—with one another.

The user device, referring to either or both of the computing device 104 and the mobile device 106, with particular reference to the mobile device 106 for illustration purposes, includes a communication interface 150, by which the mobile device 106 communicates and conducts transactions with other devices and systems. The communication interface 150 may include digital signal processing circuitry and may provide two-way communications and data exchanges, for example wirelessly via wireless communication device 152, and for an additional or alternative example, via wired or docked communication by mechanical electrically conductive connector 154. Communications may be conducted via various modes or protocols, of which GSM voice calls, SMS, EMS, MMS messaging, TDMA, CDMA, PDC, WCDMA, CDMA2000, and GPRS, are all non-limiting and non-exclusive examples. Thus, communications can be conducted, for example, via the wireless communication device 152, which can be or include a radio-frequency transceiver, a Bluetooth device, Wi-Fi device, a Near-field communication device, and other transceivers. In addition, GPS (Global Positioning System) may be included for navigation and location-related data exchanges, ingoing and/or outgoing. Communications may also or alternatively be conducted via the connector 154 for wired connections such by USB, Ethernet, and other physically connected modes of data transfer.

The processing device 120 is configured to use the communication interface 150 as, for example, a network interface to communicate with one or more other devices on a network. In this regard, the communication interface 150 utilizes the wireless communication device 152 as an antenna operatively coupled to a transmitter and a receiver (together a "transceiver") included with the communication interface 150. The processing device 120 is configured to provide signals to and receive signals from the transmitter and receiver, respectively. The signals may include signaling information in accordance with the air interface standard of the applicable cellular system of a wireless telephone network. In this regard, the mobile device 106 may be configured to operate with one or more air interface standards, communication protocols, modulation types, and access types. By way of illustration, the mobile device 106 may be configured to operate in accordance with any of a number of first, second, third, fourth, fifth-generation communication protocols and/or the like. For example, the mobile device 106 may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols such as Long-Term Evolution (LTE), fifth-generation (5G) wireless communication protocols, Bluetooth Low Energy (BLE) communication protocols such as Bluetooth 5.0, ultra-wideband (UWB) communication protocols, and/or the like. The mobile device 106 may also be configured to operate in accordance with non-cellular communication mechanisms, such as via a wireless local area network (WLAN) or other communication/data networks.

The communication interface 150 may also include a payment network interface. The payment network interface may include software, such as encryption software, and hardware, such as a modem, for communicating information to and/or from one or more devices on a network. For example, the mobile device 106 may be configured so that it can be used as a credit or debit card by, for example, wirelessly communicating account numbers or other authentication information to a terminal of the network. Such communication could be performed via transmission over a wireless communication protocol such as the Near-field communication protocol.

The mobile device 106 further includes a power source 128, such as a battery, for powering various circuits and other devices that are used to operate the mobile device 106. Embodiments of the mobile device 106 may also include a clock or other timer configured to determine and, in some cases, communicate actual or relative time to the processing device 120 or one or more other devices. For further example, the clock may facilitate timestamping transmissions, receptions, and other data for security, authentication, logging, polling, data expiry, and forensic purposes.

System 100 as illustrated diagrammatically represents at least one example of a possible implementation, where alternatives, additions, and modifications are possible for performing some or all of the described methods, operations and functions. Although shown separately, in some embodiments, two or more systems, servers, or illustrated components may utilized. In some implementations, the functions of one or more systems, servers, or illustrated components may be provided by a single system or server. In some embodiments, the functions of one illustrated system or server may be provided by multiple systems, servers, or computing devices, including those physically located at a central facility, those logically local, and those located as remote with respect to each other.

The enterprise system 200 can offer any number or type of services and products to one or more users 110. In some examples, an enterprise system 200 offers products. In some examples, an enterprise system 200 offers services. Use of "service(s)" or "product(s)" thus relates to either or both in these descriptions. With regard, for example, to online information and financial services, "service" and "product" are sometimes termed interchangeably. In non-limiting examples, services and products include retail services and products, information services and products, custom services and products, predefined or pre-offered services and products, consulting services and products, advising services and products, forecasting services and products, internet products and services, social media, and financial services and products, which may include, in non-limiting examples, services and products relating to banking, checking, savings, investments, credit cards, automatic-teller machines, debit cards, loans, mortgages, personal accounts, business accounts, account management, credit reporting, credit requests, and credit scores.

To provide access to, or information regarding, some or all the services and products of the enterprise system 200, automated assistance may be provided by the enterprise system 200. For example, automated access to user accounts and replies to inquiries may be provided by enterprise-side automated voice, text, and graphical display communications and interactions. In at least some examples, any number of human agents 210 can be employed, utilized, authorized or referred by the enterprise system 200. Such human agents 210 can be, as non-limiting examples, point of sale or point of service (POS) representatives, online customer service assistants available to users 110, advisors, managers, sales team members, and referral agents ready to route user requests and communications to preferred or particular other agents, human or virtual.

Human agents 210 may utilize agent devices 212 to serve users in their interactions to communicate and take action. The agent devices 212 can be, as non-limiting examples, computing devices, kiosks, terminals, smart devices such as phones, and devices and tools at customer service counters and windows at POS locations. In at least one example, the diagrammatic representation of the components of the user device 106 in FIG. 1 applies as well to one or both of the computing device 104 and the agent devices 212.

Agent devices 212 individually or collectively include input devices and output devices, including, as non-limiting examples, a touch screen, which serves both as an output device by providing graphical and text indicia and presentations for viewing by one or more agent 210, and as an input device by providing virtual buttons, selectable options, a virtual keyboard, and other indicia that, when touched or activated, control or prompt the agent device 212 by action of the attendant agent 210. Further non-limiting examples include, one or more of each, any, and all of a keyboard, a mouse, a touchpad, a joystick, a button, a switch, a light, an LED, a microphone serving as input device for example for voice input by a human agent 210, a speaker serving as an output device, a camera serving as an input device, a buzzer, a bell, a printer and/or other user input devices and output devices for use by or communication with a human agent 210 in accessing, using, and controlling, in whole or in part, the agent device 212.

Inputs by one or more human agents 210 can thus be made via voice, text or graphical indicia selections. For example, some inputs received by an agent device 212 in some examples correspond to, control, or prompt enterprise-side actions and communications offering services and products of the enterprise system 200, information thereof, or access thereto. At least some outputs by an agent device 212 in some examples correspond to, or are prompted by, user-side actions and communications in two-way communications between a user 110 and an enterprise-side human agent 210.

From a user perspective experience, an interaction in some examples within the scope of these descriptions begins with direct or first access to one or more human agents 210 in person, by phone, or online for example via a chat session or website function or feature. In other examples, a user is first assisted by a virtual agent 214 of the enterprise system 200, which may satisfy user requests or prompts by voice, text, or online functions, and may refer users to one or more human agents 210 once preliminary determinations or conditions are made or met.

A computing system 206 of the enterprise system 200 may include components such as, at least one of each of a processing device 220, and a memory device 222 for processing use, such as random access memory (RAM), and read-only memory (ROM). The illustrated computing system 206 further includes a storage device 224 including at least one non-transitory storage medium, such as a microdrive, for long-term, intermediate-term, and short-term storage of computer-readable instructions 226 for execution by the processing device 220. For example, the instructions 226 can include instructions for an operating system and various applications or programs 230, of which the application 232 is represented as a particular example. The storage device 224 can store various other data 234, which can include, as non-limiting examples, cached data, and files such as those for user accounts, user profiles, account balances, and transaction histories, files downloaded or received from other devices, and other data items preferred by the user or required or related to any or all of the applications or programs 230.

The computing system 206, in the illustrated example, includes an input/output system 236, referring to, including, or operatively coupled with input devices and output devices such as, in a non-limiting example, agent devices 212, which have both input and output capabilities.

In the illustrated example, a system intraconnect 238 electrically connects the various above-described components of the computing system 206. In some cases, the intraconnect 238 operatively couples components to one another, which indicates that the components may be directly or indirectly connected, such as by way of one or more intermediate components. The intraconnect 238, in various non-limiting examples, can include or represent, a system bus, a high-speed interface connecting the processing device 220 to the memory device 222, individual electrical connections among the components, and electrical conductive traces on a motherboard common to some or all of the above-described components of the user device.

The computing system 206, in the illustrated example, includes a communication interface 250, by which the computing system 206 communicates and conducts transactions with other devices and systems. The communication interface 250 may include digital signal processing circuitry and may provide two-way communications and data exchanges, for example wirelessly via wireless device 252, and for an additional or alternative example, via wired or docked communication by mechanical electrically conductive connector 254. Communications may be conducted via various modes or protocols, of which GSM voice calls, SMS, EMS, MMS messaging, TDMA, CDMA, PDC, WCDMA, CDMA2000, and GPRS, are all non-limiting and non-exclusive examples. Thus, communications can be conducted, for example, via the wireless device 252, which can be or include a radio-frequency transceiver, a Bluetooth device, Wi-Fi device, Near-field communication device, and other transceivers. In addition, GPS (Global Positioning System) may be included for navigation and location-related data exchanges, ingoing and/or outgoing. Communications may also or alternatively be conducted via the connector 254 for wired connections such as by USB, Ethernet, and other physically connected modes of data transfer.

The processing device 220, in various examples, can operatively perform calculations, can process instructions for execution, and can manipulate information. The processing device 220 can execute machine-executable instructions stored in the storage device 224 and/or memory device 222 to thereby perform methods and functions as described or implied herein, for example by one or more corresponding flow charts expressly provided or implied as would be understood by one of ordinary skill in the art to which the subjects matters of these descriptions pertain. The processing device 220 can be or can include, as non-limiting examples, a central processing unit (CPU), a microprocessor, a graphics processing unit (GPU), a microcontroller, an application-specific integrated circuit (ASIC), a programmable logic device (PLD), a digital signal processor (DSP), a field programmable gate array (FPGA), a state machine, a controller, gated or transistor logic, discrete physical hardware components, and combinations thereof.

Furthermore, the computing device 206, may be or include a workstation, a server, or any other suitable device, including a set of servers, a cloud-based application or system, or any other suitable system, adapted to execute, for example any suitable operating system, including Linux, UNIX, Windows, macOS, iOS, Android, and any known other operating system used on personal computer, central computing systems, phones, and other devices.

The user devices, referring to either or both of the computing device 104 and mobile device 106, the agent devices 212, and the enterprise computing system 206, which may be one or any number centrally located or distributed, are in communication through one or more networks, referenced as network 258 in FIG. 1.

Network 258 provides wireless or wired communications among the components of the system 100 and the environment thereof, including other devices local or remote to those illustrated, such as additional mobile devices, servers, and other devices communicatively coupled to network 258, including those not illustrated in FIG. 1. The network 258 is singly depicted for illustrative convenience, but may include more than one network without departing from the scope of these descriptions. In some embodiments, the network 258 may be or provide one or more cloud-based services or operations. The network 258 may be or include an enterprise or secured network, or may be implemented, at least in part, through one or more connections to the Internet. A portion of the network 258 may be a virtual private network (VPN) or an Intranet. The network 258 can include wired and wireless links, including, as non-limiting examples, 802.11a/b/g/n/ac, 802.20, WiMax, LTE, and/or any other wireless link. The network 258 may include any internal or external network, networks, sub-network, and combinations of such operable to implement communications between various computing components within and beyond the illustrated environment 100. The network 258 may communicate, for example, Internet Protocol (IP) packets, Frame Relay frames, Asynchronous Transfer Mode (ATM) cells, voice, video, data, and other suitable information between network addresses. The network 258 may also include one or more local area networks (LANs), radio access networks (RANs), metropolitan area networks (MANs), wide area networks (WANs), all or a portion of the internet and/or any other communication system or systems at one or more locations.

The network 258 may incorporate a cloud platform/data center that support various service models including Platform as a Service (PaaS), Infrastructure-as-a-Service (IaaS), and Software-as-a-Service (SaaS). Such service models may provide, for example, a digital platform accessible to the user device (referring to either or both of the computing device 104 and the mobile device 106). Specifically, SaaS may provide a user with the capability to use applications running on a cloud infrastructure, where the applications are accessible via a thin client interface such as a web browser and the user is not permitted to manage or control the underlying cloud infrastructure (i.e., network, servers, operating systems, storage, or specific application capabilities that are not user-specific). PaaS also do not permit the user to manage or control the underlying cloud infrastructure, but this service may enable a user to deploy user-created or acquired applications onto the cloud infrastructure using programming languages and tools provided by the provider of the application. In contrast, IaaS provides a user the permission to provision processing, storage, networks, and other computing resources as well as run arbitrary software (e.g., operating systems and applications) thereby giving the user control over operating systems, storage, deployed applications, and potentially select networking components (e.g., host firewalls).

The network 258 may also incorporate various cloud-based deployment models including private cloud (i.e., an organization-based cloud managed by either the organization or third parties and hosted on-premises or off premises), public cloud (i.e., cloud-based infrastructure available to the general public that is owned by an organization that sells cloud services), community cloud (i.e., cloud-based infrastructure shared by several organizations and manages by the organizations or third parties and hosted on-premises or off premises), and/or hybrid cloud (i.e., composed of two or more clouds e.g., private community, and/or public).

Two external systems 202 and 204 are expressly illustrated in FIG. 1, representing any number and variety of data sources, users, consumers, customers, business entities, banking systems, government entities, clubs, and groups of any size are all within the scope of the descriptions. In at least one example, the external systems 202 and 204 represent automatic teller machines (ATMs) utilized by the enterprise system 200 in serving users 110. In another example, the external systems 202 and 204 represent payment clearinghouse or payment rail systems for processing payment transactions, and in another example, the external systems 202 and 204 represent third party systems such as merchant systems configured to interact with the user device 106 during transactions and also configured to interact with the enterprise system 200 in back-end transactions clearing processes.

In certain embodiments, one or more of the systems such as the user device (referring to either or both of the computing device 104 and the mobile device 106), the enterprise system 200, and/or the external systems 202 and 204 are, include, or utilize virtual resources. In some cases, such virtual resources are considered cloud resources or virtual machines. The cloud computing configuration may provide an infrastructure that includes a network of interconnected nodes and provides stateless, low coupling, modularity, and semantic interoperability. Such interconnected nodes may incorporate a computer system that includes one or more processors, a memory, and a bus that couples various system components (e.g., the memory) to the processor. Such virtual resources may be available for shared use among multiple distinct resource consumers and in certain implementations, virtual resources do not necessarily correspond to one or more specific pieces of hardware, but rather to a collection of pieces of hardware operatively coupled within a cloud computing configuration so that the resources may be shared as needed.

Figure 2:
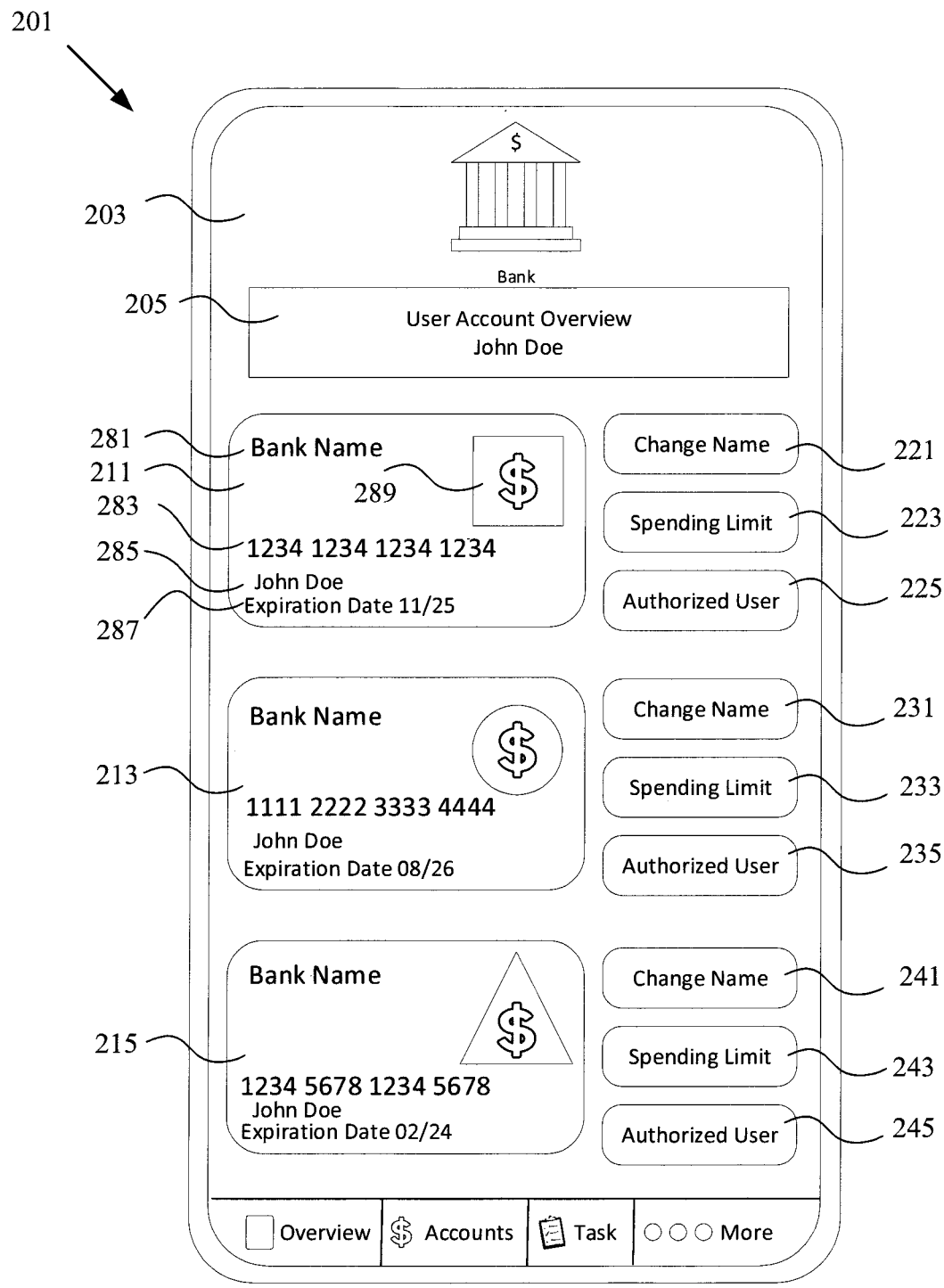
FIG. 2 depicts an example webpage associated with a user account of a user, in accordance with an embodiment of the present invention.

FIG. 2 depicts an example webpage 203 associated with a user account 205 of a user, in accordance with an embodiment of the present invention. As shown, a user device 201 may display a webpage 203 of a financial institution (e.g., a bank) that is accessible via an internet connection. According to various embodiments, the webpage 203 may include a webpage of a mobile application or a webpage (e.g., landing page) of a website accessible via the worldwide web based on, for example, the user providing an input to view their account. The webpage 203 may provide information about different financial accounts of the user. For instance, the user's financial accounts may include different checking accounts that each belong to the user. Other examples may include different types of accounts such as a savings account, a cash deposit account, a checking account, a credit card account, etc. or combinations thereof, that each belong to the user.

The user account 205 may include any financial account associated with a specific online account (e.g., tied to a specific user based on the user name input by the user in order to log in to the online account). As shown, according to one example embodiment, the webpage 203 that is depicted has details for multiple bank cards (e.g., debit cards, credit cards, prepaid cards, etc.) that are associated with a specific user account 205 of a user (depicted for a user named John Doe). For instance, as depicted, the user account 205 includes information on a first bank card 211, a second bank card 213, and a third bank card 215. Advantageously, as depicted, images of each bank card 211, 213, 215 are depicted on the webpage 203 so that user can visually see the details depicted on the actual physical bank cards that would be in the possession of the user. In particular, the image of the first bank card 211 may include, according to one embodiment, a name of the financial institution 281, the bank card number 283 (e.g., credit card number, debit card number, etc.), name of the user 285, expiration date 287, card design 289 (in order to differentiate the first bank card 211 from other bank cards of the user (e.g. the second bank card 213 and the third bank card 215)), and/or card type (e.g., Visa®, Mastercard®, American Express®, etc.). Similarly, as depicted but not independently numbered, the second bank card 213 and third bank card 215 may also include similar information (e.g., bank card number, name of the user, expiration date, card design).

Each bank card 211, 213, 215 may have associated therewith respective selectable input options corresponding to each bank card image depicted on the webpage 203. For instance, as shown, an image of the first bank card 211 has a first selectable input option 221, a second selectable input option 223, and a third selectable input option 225 that are associated with the first bank card 211. Example selectable input options may allow the user to modify various elements of their bank card. For instance, selection of the first selectable input option 221 depicted may allow the user to modify the name that is to be displayed on the first bank card. Similarly, selection of the second selectable input option 223 may allow the user to modify a spending limit associated with the first bank card 211, and selection of the third selectable input option 225 may allow the user to modify the individual users that are authorized on the account associated with the first bank card 211. According to various embodiments, although not specifically depicted by FIG. 2, additional selectable input options may also be associated with the first bank card 211 to allow the user to set a transaction limit to limit the number of purchases over a given time period, make changes to permissible or restricted geographic regions in which the first bank card 211 may be used, or to make various other customizable modifications to various elements associated with the first bank card 211.

Similarly, the second bank card 213 may also have selectable input options associated therewith, with a fourth selectable input option 231, a fifth selectable input option 233, and sixth selectable input option 235 that allow the user to make modifications to various elements of the second bank card 213. According to one embodiment, selection of any one of the selectable input options 231, 233, 235 may allow the user to customize one or more element settings associated with rules for how each element setting is regulated. For instance, if the user selects the fourth selectable input option 231, the user may be able to customize an element setting of a first name and an element setting of a last name and the rules that would be applied would modify a specific element on the physical bank card (to be sent to the user) and/or the image of the card that is displayed on the webpage 203. In another example, if the user were to select the fifth selectable input option 233, the user may be able to set an element setting for a total spending limit, an element setting for a spending limit on specific types of products, an element setting for a spending limit at specific stores, and/or an element setting for a spending limit for certain types of purchases (online vs. on-site). Each element setting would have rules associated therewith that regulate the user apparatus elements (e.g., functionalities or use cases of the actual bank card) of the user apparatus (in this case the second bank card 213). For the sixth selectable input option 235, the user may be able to set various rules for how different authorized users can utilize the second bank card 213. For instance, the user may be able to set one element setting (e.g., spending limit) for one authorized user that is different than an element setting (e.g., spending limit) of another authorized user. In another element setting, the user may be able to define whether the second bank card 213 has any additional authorized users or whether the user is the only authorized user. For example, the user may be able to add another authorized user to this bank card and order a card for the other authorized user.

Similar to the descriptions of the first bank card 211 and the second bank card 213 above, the third bank card 215 may also have various selectable input options associated therewith. For instance, the third bank card 215 may have a seventh selectable input option 241, an eighth selectable input option 243, and a ninth selectable input option 245 associated therewith. According to various embodiments, the different selectable input options 241, 243, 245 may be the same as or different from the selectable input options 221, 223, 225 of the first bank card 211 and/or the selectable input options 231, 233, 235 of the second bank card 213.

The webpage 203 may also include various other elements or functionalities that enable the user to access different webpages or functionalities available through the website of the financial institution. For instance, the webpage 203 may have a selectable input that enables the user to view account balances associated with various bank accounts, access due dates for upcoming loan payments, modify automated payments, change their password, etc.

Figure 3:
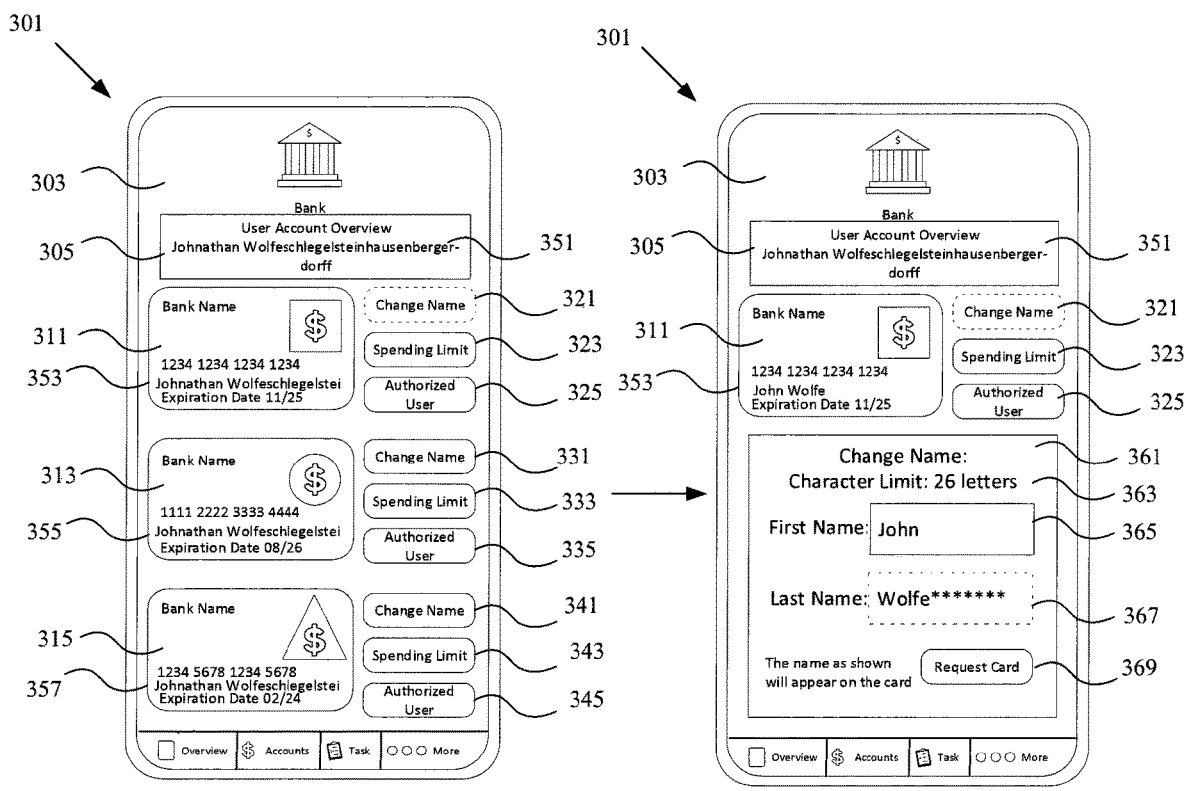
FIG. 3 depicts an example use case for modifying a modifiable visual element of an image, in accordance with an embodiment of the present invention.

FIG. 3 depicts an example use case for modifying a modifiable visual element 353 of an image 311, in accordance with an embodiment of the present invention. FIG. 3 depicts a user device 301 displaying a webpage 303 of a financial institution. The webpage 303 depicts information of a user account 305 for a user, which in this specific example is named Johnathan Wolfeschlegelsteinhausenbergerdorff. Also depicted on the webpage 303 is a first bank card 311, a second bank card 313, and a third bank card 315. The first bank card 311 has a first selectable input option 321, a second selectable input option 323, and a third selectable input option 325 associated therewith. Similarly, the second bank card 313 has a fourth selectable input option 331, a fifth selectable input option 333, and a sixth selectable input option 335 associated therewith and the third bank card 315 has a seventh selectable input option 341, an eighth selectable input option 343, and a ninth selectable input option 345 associated therewith. The first bank card 311 has a name 353 of an individual user that is displayed on the image of the first bank card 311. Similarly, the second bank card 313 also has a name 355 of an individual that is displayed on the image of the second bank card 313 and the third bank card 315 also has a name 357 of an individual that is displayed on the image of the third bank card 315.

According to one embodiment, respective selectable input options 321, 331, 341 can be selected to make modifications to the respective names 353, 355, 357 on the respective bank cards 311, 313, 315. In one particular example of the advantages provided by this functionality, a user may not like how their name appears on their bank card. In this example, the user's name is Johnathan Wolfeschlegelstein-hausenbergerdorff, which unfortunately has too many letters based on the character limitations available to be displayed on the first bank card 311 to display the user's full name. Thus, as depicted in the image of the first bank card 311, the default of the name 353 is shortened to say "Johnathan Wolfeschlegelstei" and is missing many of the letters of the user's last name. As a result, a user may want to modify the name 353 as it appears on the first bank card 311 so that it does not cut off their name at an undesired point. For instance, the user may want to abbreviate their first name and/or their last name in a way that is visually more appealing to the user.

As depicted in the example shown in FIG. 3, the user may select the first selectable input option 321 in order to make a modification to the name 353 (e.g. a modifiable visual element) on the image of the first bank card 311. Based on the first selectable input option 321 being selected, in an example embodiment a modification window 361 may be displayed on the webpage 303. The modification window 361 may include, according to one embodiment, a first input 365 to change the user's first name and/or a second input 367 to change the user's last name. As depicted in FIG. 3, this particular example has the user using the first input 365 to shorten the first name that will appear on the bank card 311 to "John" and using the second input 367 to shorten the last name that will appear on the bank card 311 to "Wolfe". Various other options are also possible such as, for example, using the first input 365 to shorten the first name to a single letter "J" and/or the last name to a single letter "W". Various other changes or abbreviations are also possible.

According to various embodiments, various other options may also be available to the user such as, for example, an option to add or change a middle name. Also depicted is one or more parameters 363 (e.g., a character limit) that may guide the user so that the user can change the modifiable visual element 353. According to one embodiment, the name 353 on the image of the first bank card 311 may also depict the changes in real-time so that the user can have a visual aid that depicts how the changes would visually appear on the first bank card 311. Also depicted, the modification window 361 may also include a selectable option 369 to accept or save the changes being made via the modification window 361.

According to one embodiment, selection of the selectable option 369 may automatically cause the computing system to transmit a request for a new physical bank card to be generated that includes the modified visual element 353 as was selected or otherwise defined by the user. Additionally once the new physical bank card is generated so that it now includes the name as defined by the user, the new bank card may be distributed to a physical location (e.g., the user's address) that is defined by the user.

Figure 4:
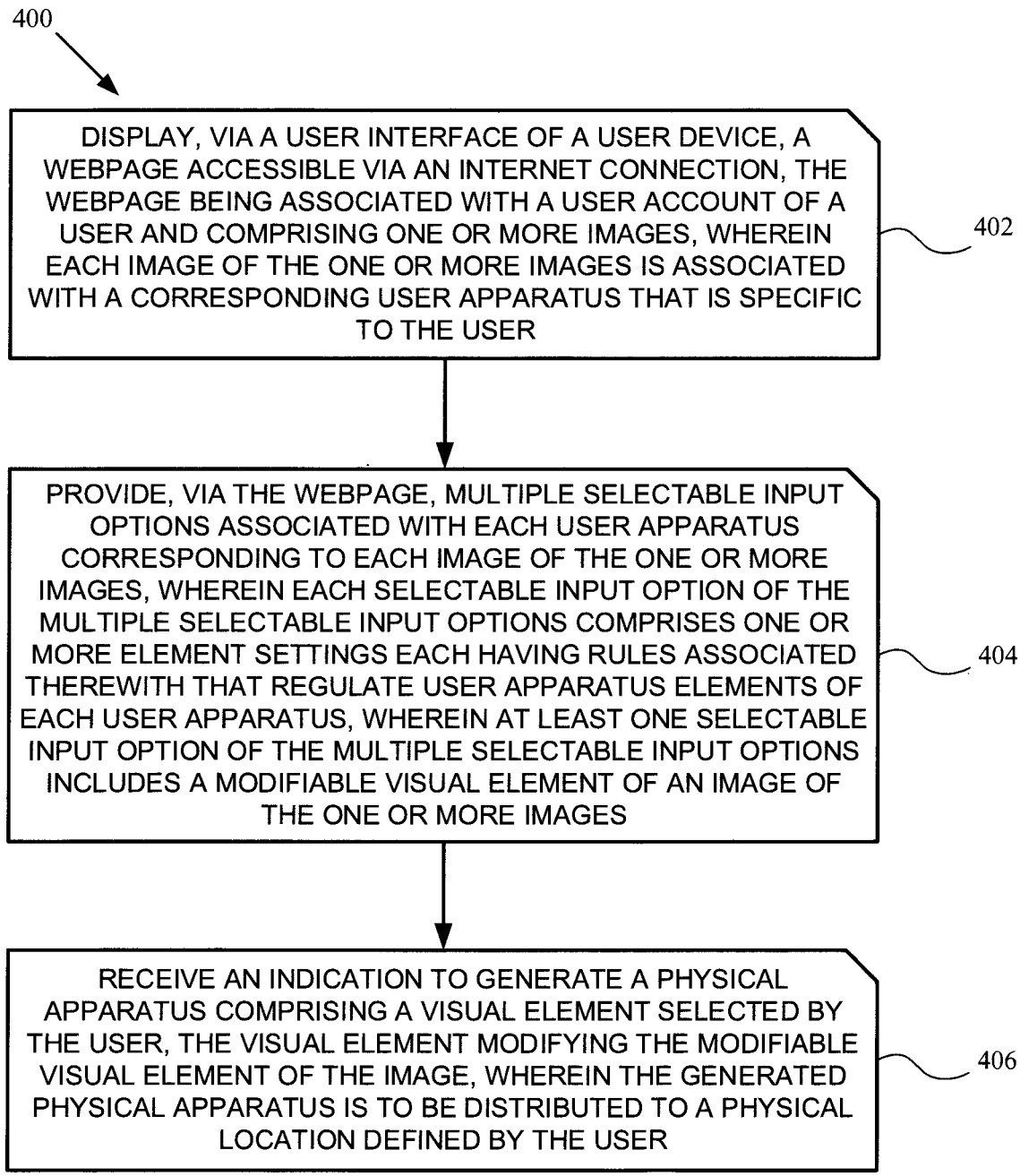
FIG. 4 depicts a block diagram of an example method for image display, in accordance with an embodiment of the present invention.

FIG. 4 depicts a block diagram of an example method 400 for image display, in accordance with an embodiment of the present invention. At block 402, the computing system displays, via a user interface of a user device, a webpage accessible via an internet connection, where the webpage is associated with a user account of a user and includes one or more images, where each image of the one or more images is associated with a corresponding user apparatus that is specific to the user. The webpage may be, according to one embodiment, a webpage of a financial institution (e.g., a bank's webpage) and is associated with a user's online account that is specific to that particular user and is accessible, for example, to the user once the user has logged in to their user account. According to one embodiment, the one or more images may include images of bank cards that are assigned to the user. For instance, the webpage may depict an image of a single bank card (e.g., a debit card, credit card, prepaid card, etc.) or multiple bank cards depending on how many bank cards are assigned to the user. Additionally, each bank card image may be associated with a corresponding user apparatus (e.g., physical bank card) that is specific to the user.

At block 404, the computing system provides, via the webpage, multiple selectable input options associated with each user apparatus corresponding to each image of the one or more images, where each selectable input option of the multiple selectable input options includes one or more element settings that each has rules associated therewith that regulate user apparatus elements of each user apparatus. Additionally, at least one selectable input option of the multiple selectable input options includes a modifiable visual element of an image of the one or more images.

The multiple selectable input options may include any input capability that allows the user to direct the computer system to perform various tasks. For instance, the selectable input options may include a selectable button, icon, a text box, a toggle, a checkbox, and/or various other options that allow the user to provide an input to the computing system. According to one embodiment, each user apparatus (e.g., bank card) may have a corresponding image of the apparatus depicted on the webpage, and multiple selectable input options are associated with each one of the images and, accordingly, each corresponding user apparatus.

Additionally, each selectable input option may include one or more element settings. For instance, one selectable input may include an icon to change the user's name as it is displayed on the physical apparatus and also as it is displayed on the image of the physical apparatus. The selectable input may include various element settings that each have rules associated therewith. For example, one element setting may allow the user to change the "first name" as it is displayed on the bank card. This element setting to change the first name may have a rule for a character limit that would apply to the first name. Thus, according to one embodiment, each user apparatus includes a corresponding bank card, and the modifiable visual element of the image of the one or more images includes a name of the user that is displayed on the corresponding bank card.

Various other elements and rules are also contemplated herein with such elements including, various geographic region usage limitations, authorized user limitations, transaction limitations, spending limitations, activations and/or deactivations or various other elements and rules. The rules regulate user apparatus elements of each user apparatus. For instance, continuing with the example of the first name and the character limitation, the character limitations regulate visual elements of the actual physical bank card. Other example rules may regulate usage elements of how the actual physical bank card can be used.

According to one embodiment, selection, by the user via the user interface, of a selectable input option of the multiple selectable input options enables the user to define an element setting of the one or more element settings of the selectable input option. For example, the user may select a selectable input option in order to define an element setting associated with the selectable input option that is selected.

As described, at least one selectable input option includes a modifiable visual element of an image of the one or more images. According to various embodiments, the modifiable visual element may include the name as depicted on the image of the physical apparatus of the images that are depicted on the webpage. Other modifiable visual elements may include, for example, a background image (e.g., a picture of mountains, flowers, a family picture, a picture of a family pet, a sports team, etc.) that is depicted on the background of the card, or various other visual elements that are depicted on the bank card, and by association the image of the bank card that is displayed on the webpage.

At block 406, the computing system receives an indication to generate a physical apparatus (e.g., a bank card) that includes a visual element (e.g., a user's name, a background image, etc.) selected by the user, the visual element modifying the modifiable visual element of the image, where the generated physical apparatus (e.g., physical bank card) is to be distributed (e.g., via the mail) to a physical location (e.g., a physical address) defined by the user.

According to various embodiments, the multiple selectable input options include a replacement request for requesting a replacement physical apparatus be distributed to the physical location defined by the user, and wherein the selection of the selectable input option enables the user to define the element setting for deactivating a previously issued physical apparatus. For instance, one selectable input option of the multiple selectable input options allows the user to request a replacement bank card and selection of the selectable input option enables the user to deactivate a previous bank card that was issued to the user. Advantageously, this functionality allows a user to deactivate their existing bank card due to their bank card being lost or stolen. In various embodiments, the user may not want to fully deactivate their bank card, but may want to request a replacement card due to their bank card being physically damaged. According to one embodiment, the multiple selectable input options may further include an editable explanation (e.g. a text box) for the user to explain why the replacement request is being selected.

According to one embodiment, each user apparatus includes a corresponding bank card, and the multiple selectable input options include an option for setting a spending limit, thereby enabling the user to assign a maximum spending amount associated with each user apparatus (e.g., bank card). This maximum spending amount may include, for example, a total spending amount maximum, a maximum amount with a certain business, a per-transaction spending limit, etc. According to one embodiment, when each user apparatus includes a corresponding bank card, the multiple selectable input options may include a transaction limit input that enables the user to assign a maximum number of transactions that can be effectuated using each user apparatus. Such transaction limits may include, for example, a total maximum amount of transactions or a maximum amount of transactions at a specific business. Various other restrictions are also contemplated herein.

According to one embodiment, the multiple selectable input options may include an authorized user input that enables the user to assign and/or delete one or more authorized users of each user apparatus. Additionally, various rules may be set for each user such as, for example, limitations for where the authorized user can use the card, transaction limits for each user, spending limits for each user, etc.

According to one embodiment, the multiple selectable input options include an authorized region input that enables the user to define a geographic region in which usage of each user apparatus is authorized. For instance, the user may indicate that purchases can be made within the state of California only, which may provide a safeguard to prevent unauthorized purchases made to the bank card.

Figure 5:
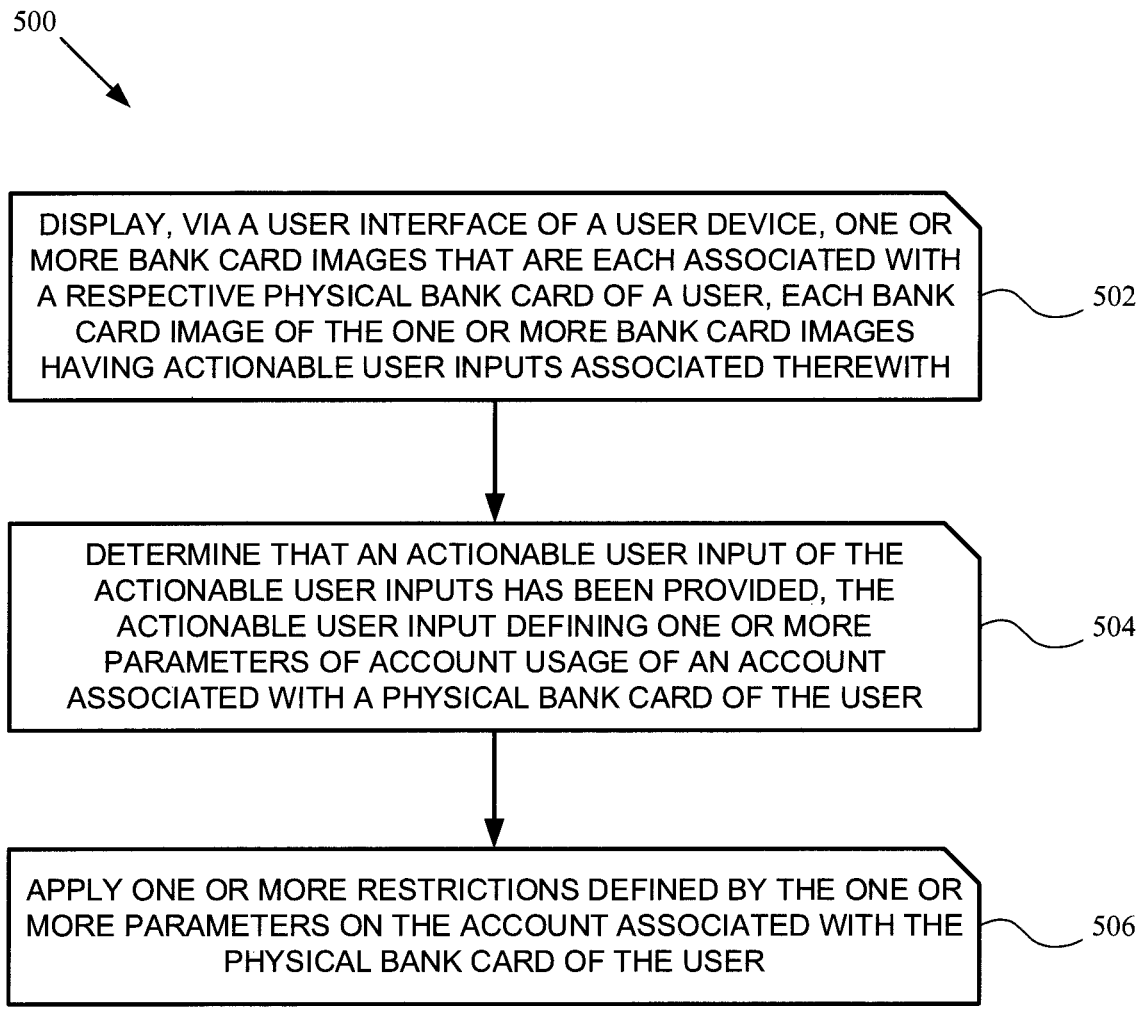
FIG. 5 depicts a block diagram of an example method for image display, in accordance with an embodiment of the present invention.

FIG. 5 depicts a block diagram of an example method 500 for image display, in accordance with an embodiment of the present invention. At block 502, the computing system displays, via a user interface of a user device, one or more bank card images that are each associated with a respective physical bank card of a user, each bank card image of the one or more bank card images having actionable user inputs associated therewith. At block 504, the computing system determines that an actionable user input of the actionable user inputs has been provided, the actionable user input defining one or more parameters of account usage of an account associated with a physical bank card of the user. At block 506, the computing system applies one or more restrictions defined by the one or more parameters on the account associated with the physical bank card of the user.

According to one embodiment, the one or more parameters may blocks usage of a card number assigned to the physical bank card of the user, and based thereon the computing system may assign a new card number to a new physical bank card. In this example, applying the one or more restrictions restricts access to the account (e.g., credit card account, bank account, etc.) associated with the physical bank card having the card number assigned thereto. According to one embodiment, the one or more parameters may set a total spending limit for purchases applied to the account associated with the physical bank card of the user. Additionally, or alternatively, the one or more parameters set a purchase amount limit for a single purchase applied to the account associated the physical bank card of the user.

Aspects of the present invention are described herein with reference to flowchart illustrations and/or block diagrams of computer-implemented methods and computing systems according to embodiments of the invention. It will be understood that each block of the flowchart illustrations and/or block diagrams, and combinations of blocks in the flowchart illustrations and/or block diagrams, can be implemented by computer readable program instructions that may be provided to a processor of a general purpose computer, special purpose computer, or other programmable data processing apparatus (the term "apparatus" includes systems and computer program products). The processor may execute the computer readable program instructions thereby creating a means for implementing the actions specified in the flowchart illustrations and/or block diagrams. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the actions specified in the flowchart illustrations and/or block diagrams. In particular, the computer readable program instructions may be used to produce a computer-implemented method by executing the instructions to implement the actions specified in the flowchart illustrations and/or block diagrams.

The computer program instructions may also be stored in a computer-readable memory that can direct a computer or other programmable data processing apparatus to function in a particular manner, such that the instructions stored in the computer readable memory produce an article of manufacture including instructions, which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions, which execute on the computer or other programmable apparatus, provide steps for implementing the functions/acts specified in the flowchart and/or block diagram block or blocks. Alternatively, computer program implemented steps or acts may be combined with operator or human implemented steps or acts in order to carry out an embodiment of the invention.

In the flowchart illustrations and/or block diagrams disclosed herein, each block in the flowchart/diagrams may represent a module, segment, or portion of instructions, which comprises one or more executable instructions for implementing the specified logical function(s). In some implementations, the functions noted in the blocks may occur out of the order noted in the Figures. For example, two blocks shown in succession may, in fact, be executed substantially concurrently, or the blocks may sometimes be executed in the reverse order, depending upon the functionality involved.

Computer program instructions are configured to carry out operations of the present invention and may be or may incorporate assembler instructions, instruction-set-architecture (ISA) instructions, machine instructions, machine dependent instructions, microcode, firmware instructions, state-setting data, source code, and/or object code written in any combination of one or more programming languages.

An application program may be deployed by providing computer infrastructure operable to perform one or more embodiments disclosed herein by integrating computer readable code into a computing system thereby performing the computer-implemented methods disclosed herein.

Although various computing environments are described above, these are only examples that can be used to incorporate and use one or more embodiments. Many variations are possible.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form contain, such as "contains" and "containing") are open-ended linking verbs. As a result, a method or device that "comprises", "has", "includes" or "contains" one or more steps or elements possesses those one or more steps or elements, but is not limited to possessing only those one or more steps or elements. Likewise, a step of a method or an element of a device that "comprises", "has", "includes" or "contains" one or more features possesses those one or more features, but is not limited to possessing only those one or more features. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of one or more aspects of the invention and the practical application, and to enable others of ordinary skill in the art to understand one or more aspects of the invention for various embodiments with various modifications as are suited to the particular use contemplated.

What is claimed is:

1. A computing system for image display, the computing system comprising:
   a memory;
   one or more processors in communication with the memory; and
   program instructions executable by the one or more processors via the memory to:
      display, via a user interface of a user device, a webpage accessible via an internet connection, the webpage being associated with a user account of a user and comprising a plurality of apparatus images, wherein each image of the plurality of apparatus images is associated with a corresponding user apparatus that is specific to the user;

provide, via the webpage, multiple selectable input options associated with each user apparatus corresponding to each image of the plurality of apparatus images, wherein each selectable input option of the multiple selectable input options comprises one or more element settings each having rules associated therewith that regulate user apparatus elements of each user apparatus, wherein at least one selectable input option of the multiple selectable input options includes a modifiable visual element of an apparatus image of the plurality of apparatus images, the modifiable visual element including a name of the user that is displayed on the apparatus image in accordance with a maximum character limit that can be displayed on a corresponding physical apparatus; and receive an indication to generate the corresponding physical apparatus comprising a visual element selected by the user, the visual element selected modifying the modifiable visual element of the apparatus image such that the name of the user depicted on the apparatus image and to be depicted on the generated physical apparatus is modified by shortening the name, wherein the generated physical apparatus is to be distributed to a physical location defined by the user.

2. The computing system for image display according to claim 1, wherein selection, by the user via the user interface, of a selectable input option of the multiple selectable input options enables the user to define an element setting of the one or more element settings of the selectable input option.

3. The computing system for image display according to claim 1, wherein the multiple selectable input options include a replacement request for requesting a replacement physical apparatus be distributed to the physical location defined by the user, and wherein the selection of the selectable input option enables the user to define the element setting for deactivating a previously issued physical apparatus.

4. The computing system for image display according to claim 3, wherein the multiple selectable input options further include an editable explanation for why the replacement request is selected.

5. The computing system for image display according to claim 1, wherein each user apparatus includes a corresponding bank card, and wherein the multiple selectable input options include a spending limit input that enables the user to assign a maximum spending amount associated with each user apparatus.

6. The computing system for image display according to claim 1, wherein each user apparatus includes a corresponding bank card, and wherein the multiple selectable input options include a transaction limit input that enables the user to assign a maximum number of transactions that can be effectuated using each user apparatus.

7. The computing system for image display according to claim 1, wherein the multiple selectable input options include an authorized user input that enables the user to assign one or more authorized users of each user apparatus.

8. The computing system for image display according to claim 1, wherein the multiple selectable input options include an authorized region input that enables the user to define a geographic region in which usage of each user apparatus is authorized.

9. A computing system for image display, the computing system comprising:

a memory;

one or more processors in communication with the memory; and program instructions executable by the one or more processors via the memory to:

display, via a user interface of a user device, a plurality of bank card images that are each associated with a respective physical bank card of a user, each bank card image of the plurality of bank card images having actionable user inputs associated therewith, at least actionable user input displayed facilitating changing a name to be depicted on the physical bank card;

determine that multiple actionable user inputs of the actionable user inputs have been provided, the actionable user inputs defining one or more parameters of account usage of an account associated with a physical bank card of the user and indicating how the name to be depicted on the physical bank card is to be changed; and apply one or more restrictions defined by the one or more parameters on the account associated with the physical bank card of the user; and initiate distribution of the physical bank card to a physical location defined by the user.

10. The computing system for image display according to claim 9, wherein the one or more parameters blocks usage of a card number assigned to the physical bank card of the user and based thereon assigning a new card number assigned to a new physical bank card, the applying the one or more restrictions restricting access to the account associated with the physical bank card having the card number assigned thereto.

11. The computing system for image display according to claim 9, wherein the one or more parameters set a total spending limit for purchases applied to the account associated with the physical bank card of the user.

12. The computing system for image display according to claim 9, wherein the one or more parameters set a purchase amount limit for a single purchase applied to the account associated the physical bank card of the user.

13. A computer-implemented method for image display within a computing environment, the computer-implemented method comprising:

displaying, via a user interface of a user device, a webpage accessible via an internet connection, the webpage being associated with a user account of a user and comprising a plurality of apparatus images, wherein each image of the plurality of apparatus images is associated with a corresponding user apparatus that is specific to the user;

providing, via the webpage, multiple selectable input options associated with each user apparatus corresponding to each image of the plurality of apparatus images, wherein each selectable input option of the multiple selectable input options comprises one or more element settings each having rules associated therewith that regulate user apparatus elements of each user apparatus, wherein at least one selectable input option of the multiple selectable input options includes a modifiable visual element of an apparatus image of the plurality of apparatus images, the modifiable visual element including a name of the user that is displayed on the apparatus image in accordance with a maximum character limit that can be displayed on a corresponding physical apparatus; and receiving an indication to generate the corresponding physical apparatus comprising a visual element selected by the user, the visual element modifying the modifiable visual element of the apparatus image such that the name of the user depicted on the apparatus image and to be depicted on the generated physical apparatus is modified by shortening the name, wherein the generated physical apparatus is to be distributed to a physical location defined by the user.

14. The computer-implemented method for image display of claim 13, wherein selection, by the user via the user interface, of a selectable input option of the multiple selectable input options enables the user to define an element setting of the one or more element settings of the selectable input option.

15. The computer-implemented method for image display of claim 13, wherein the multiple selectable input options include a replacement request for requesting a replacement physical apparatus be distributed to the physical location defined by the user, and wherein the selection of the selectable input option enables the user to define the element setting for deactivating a previously issued physical apparatus.

16. The computer-implemented method for image display of claim 15, wherein the multiple selectable input options further include an editable explanation for why the replacement request is selected.

17. The computer-implemented method for image display of claim 13, wherein each user apparatus includes a corresponding bank card, and wherein the multiple selectable input options include a spending limit input that enables the user to assign a maximum spending amount associated with each user apparatus.

18. The computer-implemented method for image display of claim 13, wherein each user apparatus includes a corresponding bank card, and wherein the multiple selectable input options include a transaction limit input that enables the user to assign a maximum number of transactions that can be effectuated using each user apparatus.

* * * * *